United States Patent
Klimowicz

(12) United States Patent (10) Patent No.: US 7,260,932 B1
Klimowicz (45) Date of Patent: Aug. 28, 2007

(54) SHAPE MEMORY ALLOY LATCHING VALVE

(75) Inventor: Michael Albert Klimowicz, Escondido, CA (US)

(73) Assignee: Therafuse, Inc., Carlsbad, CA (US)

( * ) Notice: Subject to any disclaimer, the term of this patent is extended or adjusted under 35 U.S.C. 154(b) by 0 days.

(21) Appl. No.: 11/369,345

(22) Filed: Mar. 6, 2006

(51) Int. Cl.
 *F01B 29/10* (2006.01)

(52) U.S. Cl. .......................................... 60/527; 60/528

(58) Field of Classification Search ............... 60/527, 60/528, 529
See application file for complete search history.

(56) References Cited

U.S. PATENT DOCUMENTS

| 4,645,489 A * | 2/1987 | Krumme et al. ............ 604/245 |
| 6,279,869 B1 * | 8/2001 | Olewicz ........................ 251/7 |
| 7,059,580 B1 * | 6/2006 | Gralenski ............. 251/129.06 |

* cited by examiner

*Primary Examiner*—Hoang Nguyen

(57) ABSTRACT

A shape memory activated fluid control pinch valve is disclosed. The valve may be normally open or normally closed. In various embodiments of the valve, the valve may be a latching pinch valve and may operate with magnetic assistance.

6 Claims, 3 Drawing Sheets

SHAPE MEMORY ALLOY LATCHING VALVE

FIELD OF THE INVENTION

This invention relates to pinch valves and more specifically to a latching pinch valve utilizing shape memory alloy materials.

BACKGROUND

In the field of fluid control various valves have been used to control the flow of the fluid. Well known in the field are two position valves which are either open or closed and proportional valves where the amount of fluid flowing is determined by the degree of openness or closure of the valve. Also known in the field are valves where the fluid flows directly through the valve and pinch valves where the valve operates on the external portion of the flow path to control the flow of the fluid along a flow path. An example of this latter case is a roller clamp used in the intravenous delivery of therapeutic solutions where the roller pinches the IV flow line based on its position along an inclined plane.

Also known in the art are bistable latching valves that may either be open or closed. These bistable latching valves are of particular importance when available power for operation of the valve is limited. In the case of these bistable latching valves power need only be applied to change the state of the valve; that is, from open to closed or from closed to open. Since these valves are stable in both the open position and the closed position, no power is needed to keep the valve in either the open or the closed position. Examples of latching valves are commercially available from the Lee Company of Westbrook, Conn.

Most latching valves are designed in such a manner that fluid flows through the valves. However, latching pinch valves are known, for example, solenoid latching pinch valves from the Farmington Engineering Company of Madison, Conn.

Valves taking advantage of the shape changing properties of shape memory alloys are also known. Krumme in U.S. Pat. No. 4,645,489 teaches the use of a shape memory allow to control the position of a valve closure element in a proportional valve. Edelman and Ritson in U.S. Pat. No. 4,878,646 teach the use of a shape memory alloy element to release the energy of a spring to close a pinch valve in an IV fluid delivery system. In this teaching, the shape memory alloy is only used to close the valve by releasing a latch. Reopening the valve and latching the valve open is done manually. In automatic fluid control systems, where both the closing and the opening of the fluid flow path should be done automatically under the control of an operating system, such a manual "reset" of the valve of Edelman and Ritson is impractical.

Recently, "closed loop" fluid systems for delivery of medications to patients have appeared where a fluid flow property is measured and the rate of fluid flow is adjusted based on the flow measurement. Notable examples are Sage, in U.S. Pat. No. 6,582,393, Connelly et al in U.S. Pat. No. 6,589,229 and Jerman in U.S. Pat. No. 5,533,412. While Connelly uses a piezoelectric pump and adjusts the output of the pump based on the monitored flow property, Sage and Jerman do not teach the details of the flow control means, although both do teach the flow measuring means. An automatic, low power, bistable latching pinch valve would be useful in the implementation of either the art of Jerman or Sage. None of the prior art teachings represent acceptable valves for use in these miniaturized fluid delivery systems where the fluid flow rate is measured and a microprocessor controls a valve based on the measured flow rate. Hence there remains a need for improved valving methods.

SUMMARY OF THE INVENTION

A miniature microprocessor controlled pinch valve is described. The valve may be bistable or may be a latching valve. The valve is operated by shape memory alloy elements wherein current is applied to the elements to change the length of the elements thereby activating the valve. In one embodiment, the force of a spring is applied to a valve closure element such that with no power applied, the valve is normally closed. To open the valve, current is applied to the shape memory alloy element thereby decreasing its length. The force resulting from the shape change is sufficient to overcome the force keeping the valve closed, hence the valve opens. A reduced "holding" current may be used to maintain the valve in the open position. To close the valve, current is removed from the shape memory alloy element.

Alternatively, in a second embodiment, the valve could be normally open with no power applied. In this case, when current is applied to the shape memory element, the valve is drawn closed since the force resulting from the shape change in the shape memory alloy is greater than the force keeping the valve open. To open the valve again, current is withdrawn from the shape memory element.

In a second embodiment, two shape memory alloy elements are used to operate a bistable latching valve. The valve may be normally open or normally closed, depending on the initial placement of the pinching element. In the normally closed version of this embodiment, a first shape memory alloy element is briefly energized to latch the valve in the open position. To close the valve, a second shape memory element is briefly energized to unlatch the pinching element. In the normally open version of this embodiment, the first shape memory alloy element is briefly energized to latch the valve in the closed position. To open the valve, the second shape memory alloy element is briefly energized to unlatch the pinching element, thereby opening the valve again. In drug delivery applications, the normally closed version is usually preferred since this is the position the valve will take in the event of a power failure.

In a third embodiment, a pinching element is made of a material attracted to magnets. In a first position, it is held in a position such that the flow path is pinched and flow is stopped. In a second position, it is held in position such that the flow path is open and fluid flows along the flow path. Shape memory alloy wires are used to overcome the magnetic force holding the pinching element in one or the other position thereby causing it to move from one position to the other position.

In any of the embodiments, the conduit for fluid flow is adapted to be removable from the pinching action of the pinching member. The valve is caused to be in the open position, allowing the fluid conduit to be removed from a position between the pinching member and a pinching plate. In this manner the fluid flow path is not breached, that is, the valve operates on the outside of the fluid path and does not touch the fluid. Such a non-contact feature is important for maintaining sterility of the flow path such as when the shape memory activated pinch valve is used in a drug delivery system.

The consistent theme of this invention is the automatic or logical control of both the opening and the closing of a shape memory alloy activated pinch valve. The valve may be normally open or normally closed. In general it is a latching valve in that it has two stable positions such that zero or small amounts of energy are required to maintain the valve in either of its two stable positions. It is not, however, a proportional valve where the amount of current in the shape memory element dictates the degree of openness or closure of the valve.

DETAILED DESCRIPTION

Figure 1:
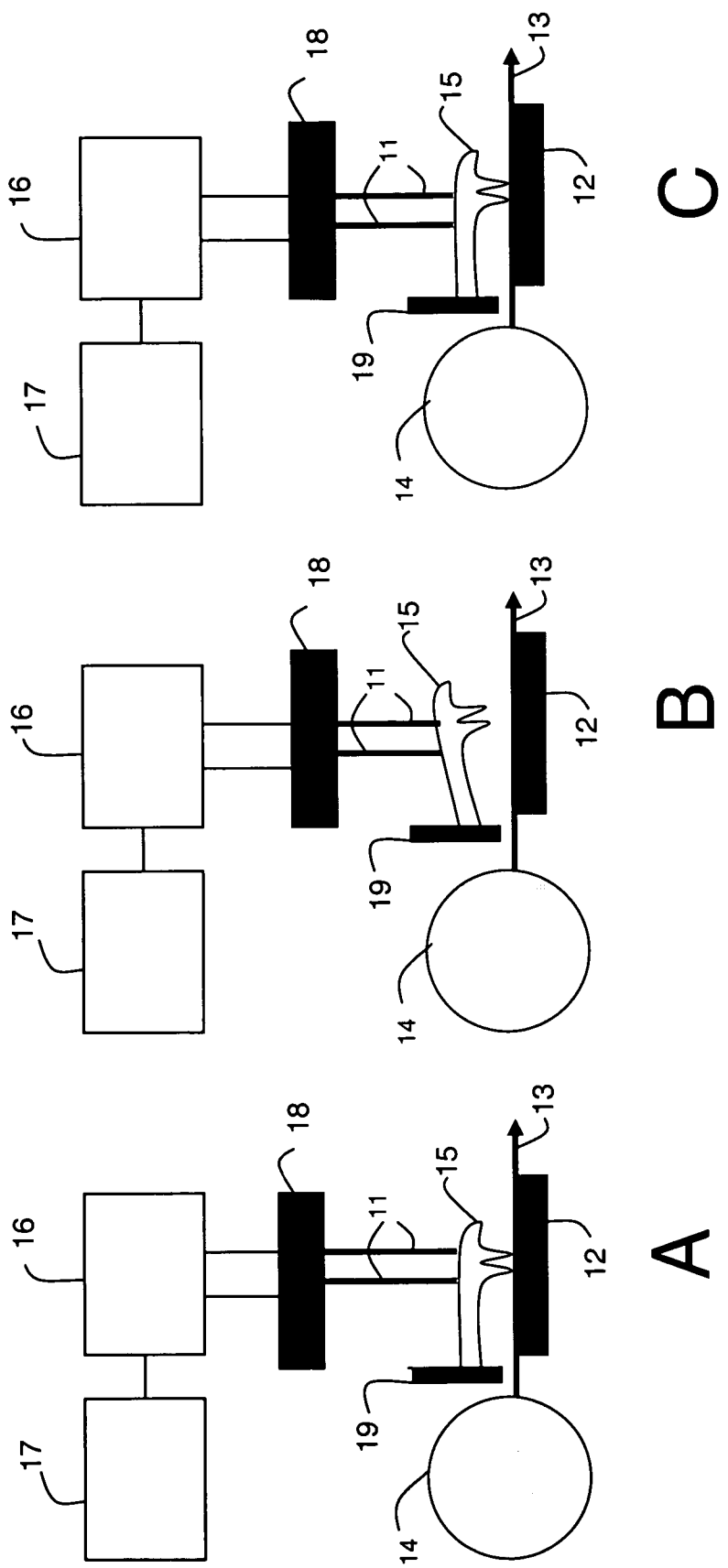
FIG. 1 shows a schematic of an automatically operated normally closed shape memory alloy activated valve.

The operation of one embodiment of the invention is described with the aid of FIG. 1, which is a schematic of a normally closed pinch valve activated by a shape memory alloy element. FIG. 1 has three drawings; FIG. 1A which shows the valve in the normally closed, unactivated state, FIG. 1B which shows the valve in the activated or open state, and FIG. 1C which shows the valve returned to the normally closed unactivated state. The shape memory alloy element is nominally a shape memory alloy wire, but other shapes of materials such as strips and coils would also be appropriate. Shown in FIG. 1 is fluid reservoir 14 which is adapted to deliver fluid along flow path 13. Flow path 13 may be any of compressible material such as silicone or may be of a laminate construction of sheet materials such that a fluid path is provided. This flow path is shown compressed in FIG. 1A between pinching element 15 and surface 12. Pinching component 15 is shown contacting flow path 13 at two locations for redundancy. Pinching component 15 is shown cantilevered from wall 19, such that flexure of pinching element 15 provides the force to compress flow path 13. Other means of providing force to compress flow path 13 are possible including a compressed spring or additional mass attached to pinching component 15. Pinching component 15 may have as few as one pinching point or may have two or more depending on the needed confidence of closure. Attached to pinching component 15 are two shape memory alloy elements 11. Two elements 11 are shown again for redundancy, but one or more than two may also be used. Shape memory elements 11 are connected at the other end to a fixed connector block 18. The connection provided by connector block 18 is an electrical as well as physical one so that current provided by current source 16 is provided to shape memory elements 11. Logical circuit 17 provides signals to current source 16 in order to operate the valve at the proper times. Logical circuit 17 may receive its input from a number of sources that are not shown, such as manual input from a human interface, from a clock circuit, or from a flow sensor such as that taught in U.S. Pat. No. 6,582,393.

FIG. 1A shows the shape memory alloy activated valve in the normally closed position. FIG. 1B shows the valve in the open position. To activate the valve to the open position, logical circuit 17 sends a signal to current source 16 to supply current to shape memory alloy elements 11 through connector block 18. Sending current through a shape memory alloy element raises its temperature, which causes a material phase change that results in a reduction in length of the shape memory alloy element. This shape change exerts a significant force overcoming the force causing pinching component 15 to compress flow path 13 and raising pinching component 15 above surface 12 thereby allowing fluid to flow along flow path 13. Pinching component 15 remains in this position until such time that logic circuit 17 sends a signal to current supply 16 to discontinue providing current to shape memory allow elements 11. Removing the current from shape memory elements 11 lowers the temperature of shape memory elements 11 thereby causing them to lengthen and return to their original length. The lengthening of shape memory alloy elements 11 allows pinching component 15 to compress fluid path 13, thereby closing the valve. This configuration of the valve after removal of current from shape memory alloy elements 11 and the subsequent return of pinching component 15 is shown in FIG. 1C.

Figure 2:
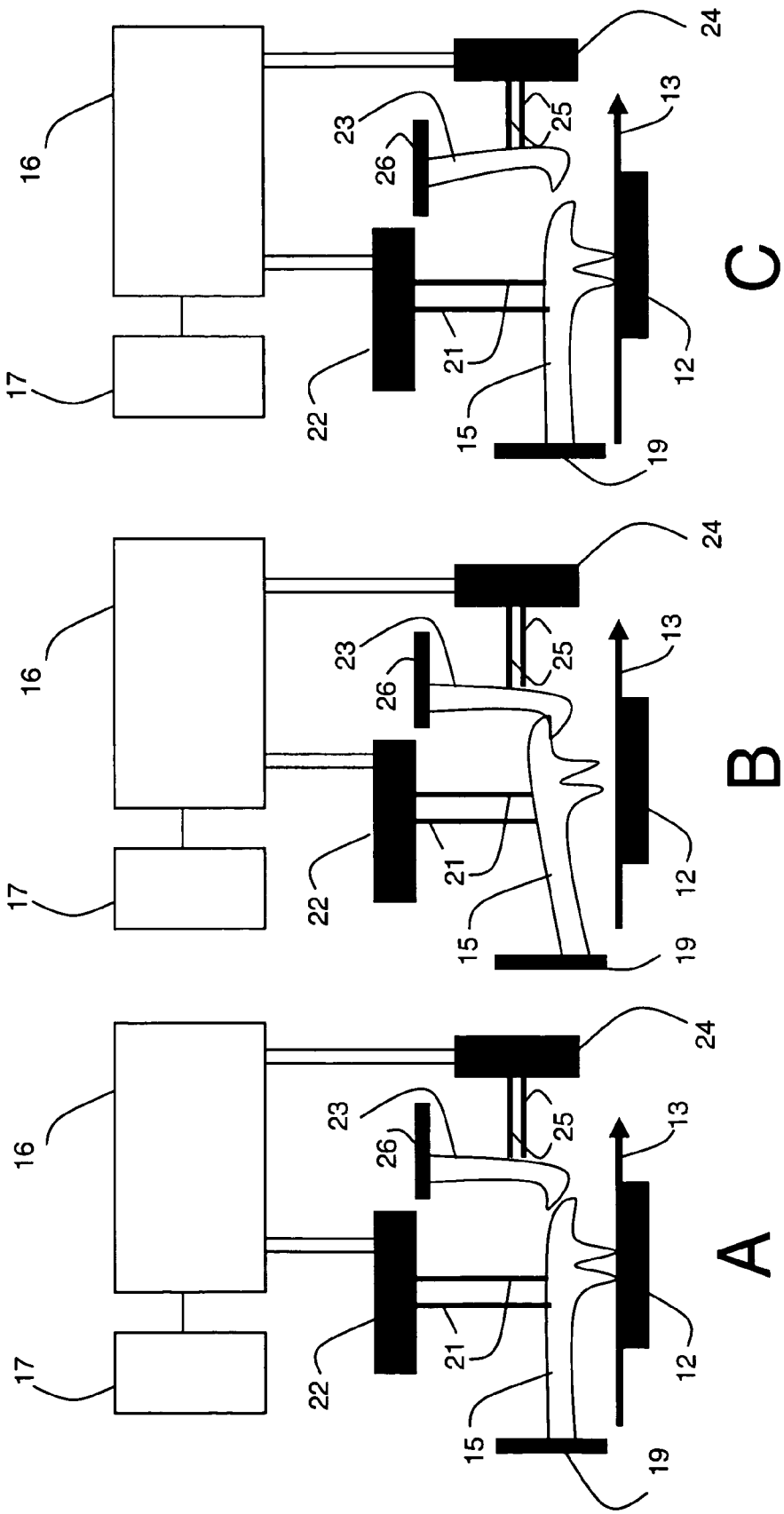
FIG. 2 shows a schematic of an automatically operated normally closed bistable latching valve activated by a shape memory alloy.

A second embodiment of the invention is shown in FIG. 2. This second embodiment is a latching valve in that it may be in either position, the open position or the closed position without requiring any power to maintain that position. FIG. 2A shows the valve in the closed position with pinching element 15 pressing flow path 13 against surface 12. Fluid to be controlled by the valve flows in flow path 13 from a fluid supply (not shown) similar to that shown in FIG. 1. Pressure to close flow path 13 may be provided by the mass of the pinching element 15, by pinching element 15 made of a flexible material and being already flexed in the position shown in FIG. 2A or by a spring (not shown but which is well known in the art) forcing pinching element 15 against flow path 13. When the decision is made to open the valve, logic circuit 17 signals current source 16 to supply current to shape memory alloy elements 25 through interface block 24. As in the previous embodiment, the number of shape memory alloy elements may vary according to the force requirements. This current causes shape memory alloy elements to shorten in length, moving latching element 23 to the position shown in FIG. 2C. The force keeping latching component 23 in the position shown in FIG. 2A may be provided by a spring (not shown) or may be due to stored elastic energy of the material of latching component 23.

Once latching element 23 is in the position shown in FIG. 1C, logic circuit 17 signals current source 16 to supply shape memory alloy elements 21 through interface block 22. This current causes shape memory alloy elements 21 to shorten in length, thereby raising pinching component 15 away from surface 12 and opening flow path 13. Once pinching component 15 is raised away from surface 12, current supply 16 withdraws current from shape memory alloy elements 25 allowing latching element 23 to resume its initial position. With pinching component 15 raised and latching component 23 in its original position, as shown in FIG. 1B, latching component 23 holds pinching component 15 away from surface 12, allowing fluid to flow in flow path 13. Current supply 16 now removes current to shape memory alloy elements 21. In this state, no current is supplied to any of the shape memory alloy elements, yet the valve remains open.

Alternatively, this opening step may be taken without activating shape memory alloy elements 25 with an appropriate shape of latching component 23. As shown in FIG. 2A, when current is applied to shape memory alloy elements 21 to pull pinching component 15 away from surface 12, the motion of pinching element 15 away from surface 12 will also move latching element 23 to the right as it slides against latching component 23. Given the force provided with latching component 23 to urge it to the position shown in FIG. 2A, once pinching element is above the latching component 23 as shown in FIG. 2B, latching component will return to the position shown in FIG. 2A thereby engaging pinching component 15 and holding it away from surface 12.

To close the valve, logic circuit 17 signals current source 16 to supply current to shape memory alloy elements 25 through interface block 24. This current causes shape memory alloy elements 25 to shorten in length, moving latching component 23 to the position shown in FIG. 2C. Latching component 23 in this position is no longer able to hold pinching component 15 above surface 12 so it springs back to its lower position where it compresses flow path 13 against surface 12, closing the valve. When logic circuit 17 signals current source 16 to stop the flow of current to shape memory alloy elements 25, they lengthen again, and latching component 23 returns to the position shown in FIG. 2A such that the valve is now ready to be opened again with signals from logic circuit 17.

Figure 3:
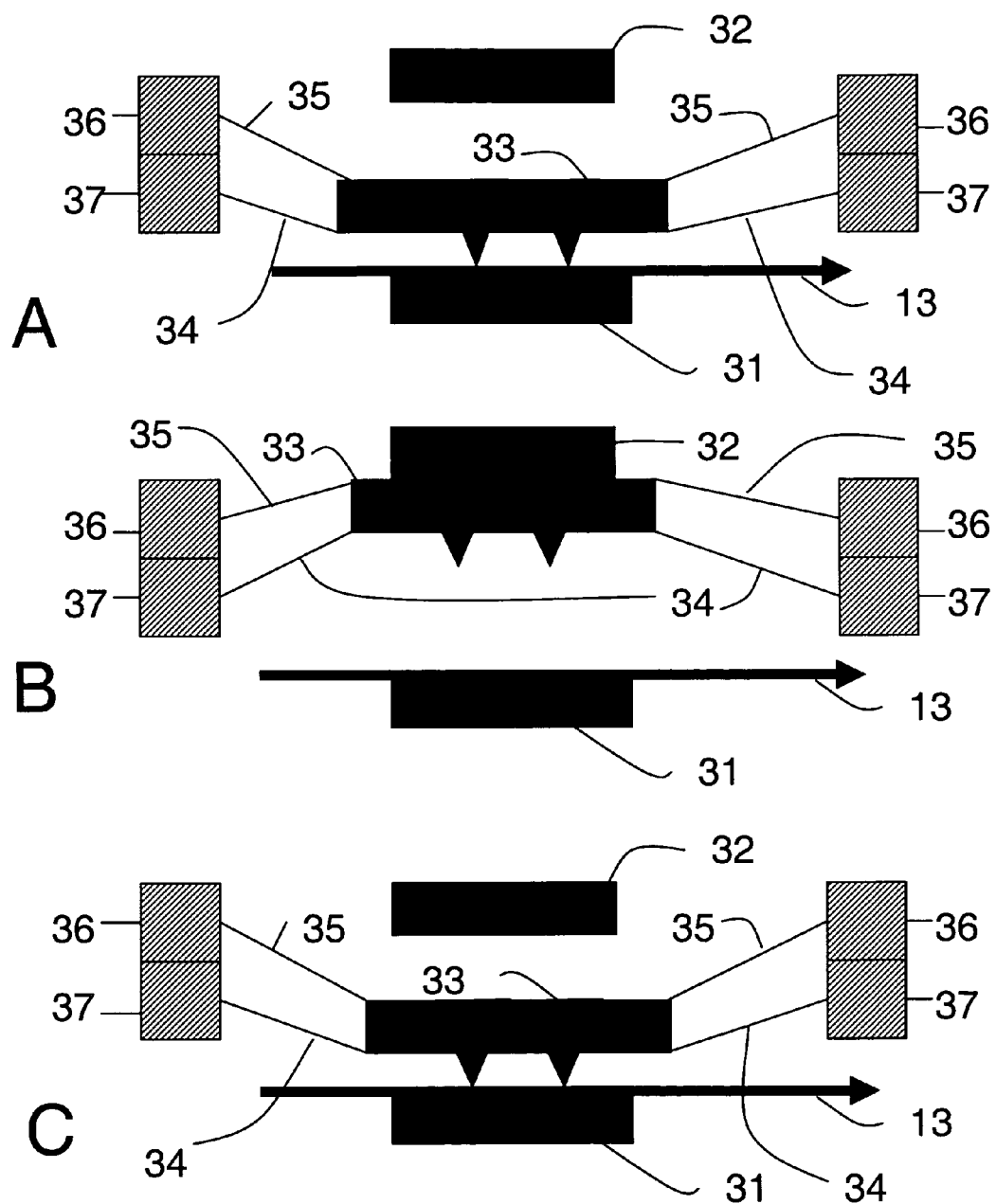
FIG. 3 shows a schematic of a shape memory alloy latching pinch valve with magnetic assist of opening and closing the valve.

A third embodiment of the invention is shown in FIG. 3. The shape memory alloy activated valve is designed to open or close flow path 13 by pinching flow tube 13 between pinching component 33 and pinch block 31. This third embodiment latches the valve in the open or closed position by using magnets 31, which is also pinch block 31, and magnet 32. Shown in FIG. 3A is the valve in the normally closed position with pinching component 33 pressing against flow path 13. At a selected time current source 36 activates shape memory alloy wires 35 causing the wires shorten. This shortening of shape memory alloy wires 35 causes pinching component 33 to move upward. When pinching component 33 moves upward, it is pulled further upward by the magnetic field of magnet 32, causing pinching component 33 to come to rest as shown in FIG. 3B. In this way the valve is opened by a single short pulse of current from current source 36 and is held upon by magnet 32.

When a time arrives when the valve is to be closed, current from current source 37 activates shape memory alloy wires 34 causing them to shorten. The shortening of shape memory alloy wires 34 causes pinching component 33 to move downward. As pinching component 34 moves downward, the magnetic field of pinch block and magnet 31 pulls it down further causing it to come to rest firmly in the grip of magnet 31, closing the valve as shown in FIG. 3C. In one embodiment of the magnetically assisted valve of FIG. 3, magnet 31 exerts a larger magnetic force on pinching component 33 than magnet 32 thereby providing additional assurance that the valve is normally in the closed state.

I claim:

1. A shape memory alloy activated pinch valve comprising:
   a) a flexible flow path forming a conduit for fluid flow,
   b) a surface against which the fluid flow path may be compressed,
   c) a pinching component adapted to be positioned at either of two locations, a first location where the fluid flow path is compressed against the surface by the pinching component so that no fluid may flow along the flow path and a second location where the fluid flow path is not compressed against the surface by the pinching component so that fluid may flow along the flow path,
   d) a current source,
   e) a first shape memory alloy element adapted to receive current from the current source and connected to the pinching component such that the pinching component is positioned at its first location when no current is provided to the first shape memory alloy element, and is positioned at its second location when current is provided to the first shape memory alloy element,
   f) a latching component adapted to be positioned at either of two locations, a first location where the latching component engages the pinching component in its second location and a second location where the latching component does not engage the pinching component thereby allowing the pinching component to return to its first location,
   g) a second shape memory alloy element adapted to receive current from the current source and connected to the latching component such that the latching component is positioned at its first location when no current is provided to the second shape memory alloy element and is positioned at its second location when current is provided to the second shape memory alloy element, and
   h) a logical network for determining the timing of providing current to the first and second shape memory alloy elements.

2. The shape memory alloy valve of claim 1 wherein the flexible flow path is formed by lamination of two or more components.

3. The shape memory alloy valve of claim 1 wherein the flexible flow path is adapted to removably mate with the valve such that the flow path is open when the pinching component is in the second position and the flow path is closed when the pinching component is in the first position.

4. A shape memory alloy activated pinch valve comprising
   a) a flexible flow path forming a conduit for fluid flow,
   b) a surface against which the fluid flow path may be compressed,
   c) a pinching component adapted to be positioned at either of two locations, a first location where the fluid flow path is compressed against the surface so that no fluid may flow along the fluid flow path and a second location where the fluid flow path is not compressed against the surface so that fluid may flow along the fluid flow path,
   d) a source of current,
   e) one or more first shape memory alloy elements adapted to receive current from the current source and connected to the pinching component such that the pinching component is moved from the first position to the second position when current is provided to the first shape memory alloy elements,
   f) one or more second shape memory alloy elements adapted to receive current from the current source and connected to the pinching component such that the pinching component is moved from the second location to the first location when current is provided to the second shape memory alloy elements,
   g) a first magnet positioned to hold the pinching component in the first position,
   h) a second magnet positioned to hold the pinching component in the second position and,
   i) a logical network for determining the timing of providing current to the shape memory alloy element.

5. The shape memory alloy valve of claim 4 wherein the flexible flow path is formed by lamination of two or more components.

6. The shape memory alloy valve of claim 4 wherein the flexible flow path is adapted to removably mate with the valve such that the flow path is open when the pinching component is in the second position and the flow path is closed when the pinching component is in the first position.

* * * * *